Feb. 23, 1960 T. B. EDWARDS 2,926,047
VEHICLE WHEEL ASSEMBLY
Filed Nov. 25, 1958 2 Sheets-Sheet 2
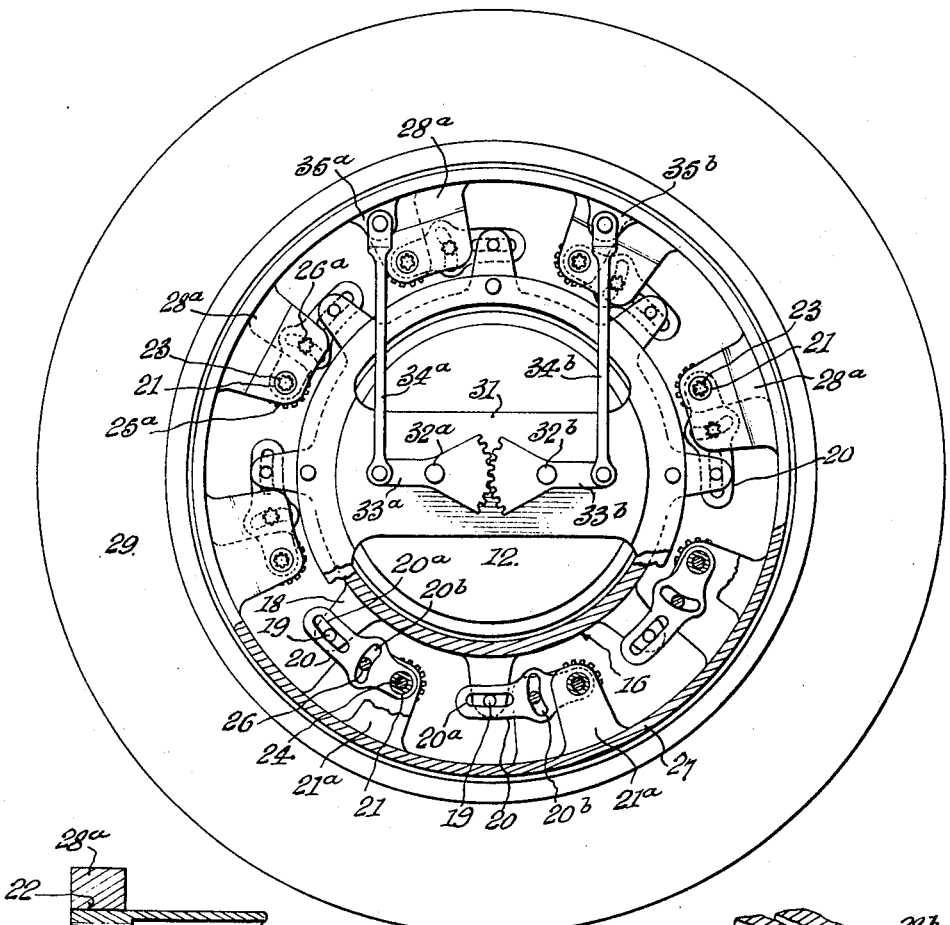
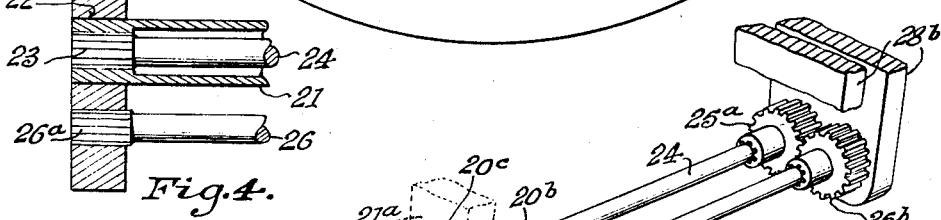
INVENTOR.
Theodoric B. Edwards
BY
ATTORNEYS United States Patent Office 2,926,047
Patented Feb. 23, 1960

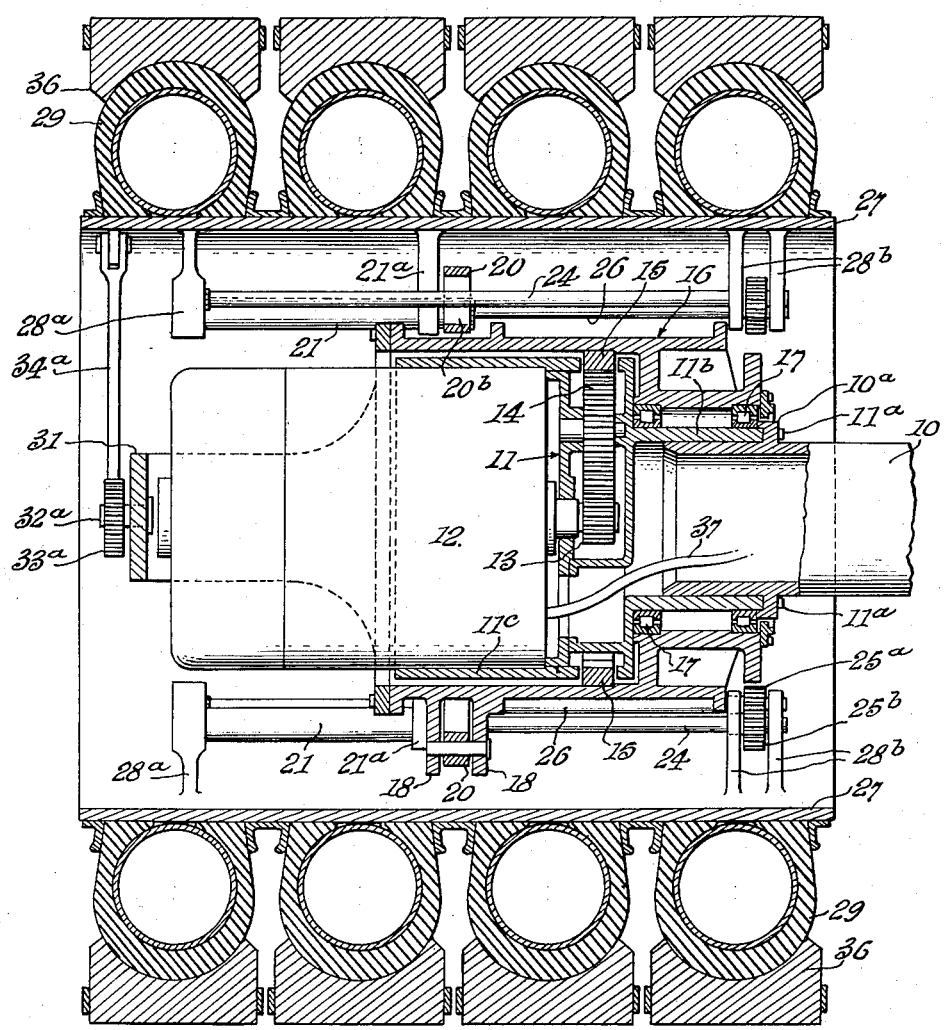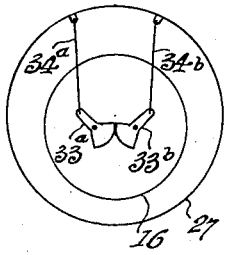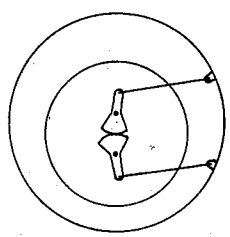

2,926,047

VEHICLE WHEEL ASSEMBLY

Theodoric B. Edwards, Alexandria, Va.

Application November 25, 1958, Serial No. 776,392

9 Claims. (Cl. 305—34)

(Granted under Title 35, U.S. Code (1952), sec. 266)

The invention disclosed herein may be manufactured and used by or for the Government for governmental purposes without the payment of any royalty thereon.

The present invention relates to improvements in land vehicle propulsion and support wheels. More particularly, this invention relates to vehicle wheels which have a spring torsion cushion means between the hub and rim, a coupling to transmit torque from the hub to the rim, and are adapted to house an electric motor within the hub.

The use of diesel-electric power in extra large land vehicles such as earth movers has become commonplace. In such a propulsion system an internal combustion engine is used to drive an electric generator and the electricity generated is used to drive electric motors which in turn drive the wheels. For many obvious reasons it is advantageous to have a separate electric motor for each wheel. Further, it is desirable to mount each motor externally of the vehicle body to increase the usable space in the vehicle body and to decrease the mechanical complexity of the torque transmitting gear train. However, some difficulties are encountered when the motor is mounted on the axle. Conventional spring-suspended axles can be used, but when the motor is mounted directly on the axle, the motor is not spring supported. That is, the motor is subject to all the jolts and shocks received by the wheel and axle but spared the body by the spring suspension system. Accordingly, the vehicle is limited in speed when operating over rough and uneven terrain because of likely damage to the motor, etc. If the motor is mounted in the body to take advantage of spring suspension, of course some type of differential drive shaft must be employed to connect the motor and shaft. This introduces undesirable mechanical complications.

Therefore, the principal object of the present invention is to provide a torsion spring suspension system interposed between the hub and rim to absorb the jolts and shocks received by the rim without transmitting them to the hub, thereby allowing greater operating speeds over rougher terrain.

A further object of this invention is to provide a wheel which will house an electrical motor within the hub thereby increasing the usable space within the body of the vehicle and which will allow a simplified torque transmission connection between the motor and hub.

Still another object of the present invention is to provide a separate and distinct linkage between the hub and rim of the wheel which will not interfere with relative radial motion between the hub and rim, thereby allowing complete and efficient operation of the torsion suspension system, yet will at all times positively transmit torque from the hub to the rim.

Additional objects and advantages will be apparent to those skilled in the art from the following detailed description of the chosen embodiment and drawings thereof, wherein:

Fig. 1 is a cross sectional side view taken along the axis of rotation of the wheel assembly;

Fig. 2 is an end view of the device of Fig. 1 partially broken away to show features of construction;

Fig. 3 is a perspective view of the torsion bar linkage unit used in the structure of Fig. 1;

Fig. 4 is a cross sectional view taken substantially along line 4—4 of Fig. 3;

Figs. 5, 6 and 7 diagrammatically illustrate progressive positions of the torque transmitting linkage system when imparting clockwise rotation to a vehicle wheel rim.

Referring to the drawings, the wheel assembly of Fig. 1 is essentially comprised of a shaft 10 rigidly fixed to the body of the vehicle with a motor 12 rigidly carried by the end of said shaft; a hub 16 is supported by bearings 17 on the shaft and surrounds the motor which drives the hub by a gear train. A rim 27 encircles the hub 16 and is linked thereto by a number of torsion bar linkages (Fig. 3). The rim 27 and torsion units rotate with the hub 16 as in conventional wheel assemblies. A torque-transmitting linkage, independent of the torsion linkage between the hub and rim, transmits the torque on the hub to the rim, and a number of pneumatic tires are carried by the rim. This whole assembly is adapted to cooperate with other like wheel assemblies to carry an endless track.

Describing the wheel assembly in more detail, rigid shaft 10 is anchored securely to the body of the vehicle and is hollow to house electrical wires 37. A cylindrical support frame 11 is rigidly attached to shaft 10 by bolts 11a which pass through flange 10a into sleeve 11b. Support frame 11 rigidly supports electric motor 12 by sleeve 11c and, by appropriate framework, supports and houses idler gear 14. Hub 16 is also cylindrical, has an internal configuration approximating that of support frame 11, and is carried on roller bearings 17, the inner races of which are carried by sleeve 11b. Therefore, hub 16 is free to revolve around the stationary structure comprising the axle 10, support frame 11, and motor 12. The hub 16 is driven by the motor 12 through the gear train comprised of the motor shaft pinion gear 13 which meshes with idler gear 14 which meshes with the internal gear 15 around the inside circumference of hub 16.

For purposes of bearing the load of the vehicle, including the above-mentioned stationary structure of the wheel, the hub 16 is connected to a rim 27 by a number of torsion bar linkage units constructed as shown in Fig. 3. Eight torsion bar units are shown in the chosen embodiment (Fig. 2), but any number within reason could be used. A trunnion 18 for each linkage unit is rigidly fixed to the hub 16 and carries a pin 19. Another trunnion is formed by spurs 28a and 28b attached to rim 27. Lever 20 receives the pin 19 in longitudinal slot 20a. Lever 20 is rigidly attached to sleeve 21 at spline 20c. Sleeve 21 extends into a bearing 22 in spur 28a and is rigidly attached to torsion rod 24 at spline 23. Torsion rod 24 extends to spur 28b where it is held in a bearing and is rigidly attached to gear 25a which is in mesh with gear 25b. Gear 25b is rigidly carried by a second torsion rod 26 which is also supported by a bearing in spur 28b, and extends through a transverse slot 20b in lever 20 and is rigidly held in spur 28a by spline 26a. By using gears 25a and 25b a pair of shorter rods give torsion action equivalent to a single rod equal to the combined length of rods 24 and 26. A spur 21a also extends inwardly from the rim 27 and receives in a bearing and braces sleeve 21, thereby counteracting the bending moment tending to bend sleeve 21 around the bearing 32 in member 28a. With spur 21a thus counteracting the bending moment, the load of the vehicle, acting as a force exerted on lever 20 by pin 19, is transmitted as a twisting moment or torsion on sleeve 21 which transmits this torsion by spline 23 to rod 24. The torsion is then transmitted by gears 25a and 25b to rod 26 which is rigidly held by spline 26a in spur 28a on rim 27. Since rod 26 is not free to rotate by reason of spline 26a, the force of pin 19 on lever 20 is resisted by the combined resiliency or resistance to twisting of sleeve 21, rod 24, and rod 26. By the number of torsion rod units stationed around the wheel as shown in Fig. 2, a floating, spring-like suspension of the hub within the rim is accomplished as the wheel moves along as will hereinafter be described.

As noted above, in each torsion bar unit a pair of torsion rods connected by intermeshing gears are used instead of a single, longer rod. Of course, one rod could be used. Or any number of rods, within reason, could be combined by gears as shown. Gears of different ratios could be used to put different torques on different rods. Selection of proper combination depends upon such factors as weight to be supported, anticipated maximum impact loads, width of wheel desired, and strength and resiliency of the material used for fabricating the torsion bars, etc.

In operation, the weight of the vehicle including the stationary parts of the wheel are transmitted to the hub 16 through anti-friction bearings 17. The hub is suspended within the rim 27 by means of the torsion linkage units. Obviously, the weight acting on the hub will always cause the hub to ride below the center of the rim. Regarding the lever members 20 which are positioned perpendicular to the direction the hub is displaced (those at the top and bottom of Fig. 2), the levers are either pulled down or pushed down by the weight of the hub thereby putting torque on the rods 24, 26, as explained above. The rods resist this torque, thereby giving a spring torsion suspension of the hub within the rim. The lever members 20 which are parallel to the direction the hub is displaced from the center of the rim (the ones positioned on each side in Fig. 2), do not aid in supporting the hub, but do allow free radial movement of the hub relative to the rim within the limits of longitudinal slots 20a. Obviously, the lever members 20, which are between the perpendicular and parallel linkages, both contribute to the support of the hub and also allow the pin 19 to slide along longitudinal slot 20a as required.

The terminals of transverse slots 20b and the longitudinal slots 20a serve as bumpers to prevent excessive displacement of the hub within the rim. When lever 20 is depressed excessively, the lever abuts against rod 26 which passes through transverse slot 20b, rod 26 thereby acting as a bumper or stop. When pin 19 abuts either end of the longitudinal slot 20a, a similar bumper action results. Accordingly, the lengths of slots 20a and 20b should be correlated so that the bumper action for each set of slots comes into play simultaneously.

The rim 27 is adapted to receive a number of pneumatic tires 29 (four shown). It is often desirable to use a number of the above described wheels aligned in a common plane of rotation on one side of the vehicle to carry an endless track 36. This is particularly desirable under arctic conditions and the like. If the torsion suspension system described above is to function properly, it is necessary that no torque be transmitted from the hub through or by means of the suspension system to the rim. In other words, the hub must not rotate relative to the rim or the longitudinal slots 20a would be ineffectual because pin 19 would always be jammed against one end of slot 20a and hence would not allow hub 16 to ride in a free floating position below the center of rim 27. Accordingly, a separate and distinct linkage system is provided which transmits torque from the hub 16 to the rim 27. Torque is transmitted from electric motor 12 through the gear train to the hub 16 as previously described. A yoke 31 is rigidly attached to hub 16 and enshrouds the motor 12 as shown. Pins 32a and 32b are rigidly attached to yoke 31 and are pivot supports for oppositely extending gear levers 33a and 33b which have meshing gear segments at the adjacent ends thereof. Connecting rods 34a and 34b pivotally link the ends of gear levers 33a and 33b with rim spurs 35a and 35b which are rigidly attached to rim 27.

The operation of the above described torque linkage will now be explained by way of analogy. One method of transmitting torque from the hub to the rim would be to rigidly attach a single bar to yoke 31 and link the ends thereof to the rim 27. From a torque transmitting standpoint, the two gear levers 33a and 33b are equivalent to a single bar rigidly attached to yoke 31. Assume that torque is applied to the hub in a clockwise direction in Fig. 2. Gear lever 33b would then tend to move downward and thereby put tension in tie-rod 34b. The tension in tie-rod 34b would be transmitted by gear lever 33b through the meshing gear segments to gear lever 33a as a face tending to force the gear lever segment of 33a downward and hence the tie-rod 34a upward. Tie-rod 34b is therefore under tension and tie-rod 34a is under compression. In other words, tie-rod 33b is pulling rim 27 around and tie-rod 33a is pushing rim 27 around in the same manner as if the two tie-rods were attached to a single rigid bar securely fastened to yoke 31 at two points, such as at fulcrum pins 32a and 32b. Furthermore, by a free body diagram it will be seen that the force pulling on lever 33b is equal in magnitude to that pushing on lever 33a, which would be true in the case of a single bar. Therefore, no resulting force due to torque is exerted on yoke 31 which would tend to displace the yoke and hence the hub from the center of rim 27 and thereby interfere with the torsion suspension system.

However, the torque transmitting linkage described above contributes an additional indispensable feature over a rigidly attached single bar. Specifically, this feature is flexibility which allows yoke 31 to be displaced radially relative to the axial center of rim 27. Figs. 5, 6 and 7 are schematic diagrams showing hub 16 and hence yoke 31 displaced radially from the center of rim 27 as will always be the case when the load of the vehicle is resting on and supported by the torsion suspension system. Fig. 5 shows the positions of the torque transmitting linkage members when the tie-rods 33a and 33b are extended upwardly or away from the ground. Fig. 6 shows the position of the linkage members when the tie-rods are extended horizontally, and Fig. 7 when the tie-rods are extended toward the ground. In each case the gear segments of the two gear levers 33a and 33b remain in mesh and hence the two levers continue to cooperate as a single bar as described above, yet the linkage system allows the yoke to be displaced in any radial direction without interfering with the operation of the torsion suspension system.

I claim:

1. A vehicular wheel assembly comprising an inner hub floatingly suspended within an outer rim by a plurality of torsion rod linkage units disposed around the inner periphery of said outer rim, each of said units having a torsion member rigidly attached at one end to said rim, and each of said units having a lever arm pivotally linked to said hub and linked to said torsion member to transmit and convert the load on said hub to a twisting moment on said torsion member.

2. A wheel assembly as set out in claim 1 including means to generate torque, means to transmit torque to said hub, and linkage means independent of said torsion rod units to transmit said torque from said hub to said rim.

3. A wheel assembly as set out in claim 2 wherein said hub is carried by bearings on a shaft rigidly connected to a vehicle, said means to generate torque is a motor mounted adjacent the end of said shaft and within said hub, and the means to transmit torque to said hub is a gear train.

4. A wheel assembly comprising a cylindrical hub supported on a shaft by bearings, a rim concentric with said hub, a plurality of torsion rod units disposed around the inner periphery of said rim, each of said torsion rod units having a first torsion rod rigidly attached to one end of said rim and interconnected by intermeshing gears at the other end with a second torsion rod of said torsion rod unit, a lever arm rigidly attached to said second torsion rod, said lever arm being pivotally linked to said hub in a manner to transmit and convert the load on said hub to a twisting moment on said second torsion rod which is thereby transmitted to said first torsion rod by said intermeshing gears.

5. A wheel assembly as set out in claim 4 including a motor mounted on said shaft and within said hub, a gear train to transmit torque from said motor to said hub, a pair of oppositely extending lever arms pivotally mounted on said hub and having intermeshing gear segments at the adjacent ends thereof, each of said lever arms being pivotally connected at the extending ends thereof to a linkage member which is pivotally connected to said rim.

6. A torsion suspension apparatus interconnecting a support member and a suspended member comprising a first torsion member rigidly connected at one end to said support member and bearing supported by said support member at the other end thereof, a gear rigidly connected to said first torsion member adjacent to the bearing supported end and meshing with a gear rigidly connected to a second torsion member, said second torsion member being bearing supported adjacent both ends by said support member, a crank arm rigidly attached to said second torsion member and pivotally linked to said suspended member for transmitting the load of said suspended member as torque on said second torsion member.

7. A vehicular wheel assembly having an inner hub floatingly suspended within an outer rim, means to transmit torque to said hub, and a pair of oppositely extending lever arms pivotally mounted on said hub and having intermeshing gear segments at the adjacent ends, each of said lever arms being pivotally connected at the extending ends thereof to a linkage member which is pivotally connected to said rim.

8. A vehicular wheel assembly comprising an inner hub floatingly suspended within an outer rim by a plurality of torsion rod units, each of said units having a plurality of torsion rods disposed parallel to the axis of rotation of said wheel, a first torsion bar having one end rigidly attached to said rim and bearing supported at the other end by said rim, a gear rigidly attached to said first torsion rod adjacent said bearing supported end meshing with a gear rigidly attached adjacent one end of a second torsion rod extending parallel to said first rod, said second rod being bearing supported at each end thereof by said rim, a lever arm rigidly attached to said second torsion rod and having a transverse slot therein receiving a pin rigidly connected to said hub, said lever arm transmitting the load on said hub as a torque on said torsion rods.

9. A wheel construction as set out in claim 8 wherein said hub is bearing-supported on a shaft rigidly attached to said vehicle, a motor rigidly attached to said shaft and disposed within said hub, means to transmit the torque generated by said motor to said hub, and a pair of oppositely extending lever arms pivotally mounted on said hub and having intermeshing gear segments at the adjacent ends thereof, each of said lever arms being pivotally connected at the extending ends thereof to a linkage member which is pivotally connected to said rim, and a pneumatic tire carried by said rim.

References Cited in the file of this patent
UNITED STATES PATENTS

| | | |
|---|---|---|
| 1,166,697 | Likely | Jan. 4, 1916 |
| 1,298,881 | Buchli | Apr. 1, 1919 |
| 1,387,777 | Henry | Aug. 16, 1921 |
| 1,560,224 | Filleul | Nov. 3, 1925 |
| 1,738,635 | Buchli | Dec. 10, 1929 |
| 1,873,953 | Buchli | Aug. 30, 1932 |